United States Patent [19]
Lasoen

[11] Patent Number: 5,217,097
[45] Date of Patent: Jun. 8, 1993

[54] CONTROL SYSTEM FOR FLUID PRESSURE OPERATED CLUTCH

[75] Inventor: Jean J. Lasoen, Villepreux, France

[73] Assignee: Massey-Ferguson Services S.A., Kenilworth, England

[21] Appl. No.: 886,550

[22] Filed: May 20, 1992

[30] Foreign Application Priority Data

May 25, 1991 [GB] United Kingdom ............... 9111387

[51] Int. Cl.[5] .................. B60K 41/22; F16D 25/14
[52] U.S. Cl. .................... 192/3.58; 192/83; 192/85 R; 192/103 F
[58] Field of Search .......... 192/84 R, 90, 3.58, 192/83, 85 R, 103 F

[56] References Cited

U.S. PATENT DOCUMENTS

| | | | |
|---|---|---|---|
| 3,548,980 | 12/1970 | Vorra | 192/3.58 X |
| 4,527,679 | 7/1985 | Hamada et al. | 192/3.58 |
| 4,533,030 | 8/1985 | Gabriel | 192/3.58 X |
| 5,097,931 | 3/1992 | Focqueur et al. | 192/83 |
| 5,101,688 | 4/1992 | Pearce et al. | 192/3.58 X |

FOREIGN PATENT DOCUMENTS 399399   5/1990   European Pat. Off. .

*Primary Examiner*—Richard M. Lorence
*Attorney, Agent, or Firm*—MacMillan, Sobanski & Todd

[57] ABSTRACT

A control system for the control of a fluid pressure-operated clutch (12) is provided. It includes a fluid pressure-operated clutch actuator (14) and a source of pressurized fluid (15). A fluid flow control valve (18) controls the flow of pressurized fluid to and exhaust of fluid from the actuator. A manually operable clutch control member (19) (e.g. a pedal) is connected via a linkage (20) to the valve (18) to enable engagement-/disengagement of the clutch by operation of the control member. An electrical actuator (33) is also provided for operation of the valve, and hence clutch, independently of the manually operable clutch control member. The system further includes a sensor (19a) for sensing the position of the clutch control member and an electrical control circuit (21) for independent control of the valve in response to predetermined vehicle operating criteria. The electrical control circuit is capable of commanding complete disengagement of the clutch irrespective of the position of the clutch control member but is only capable of commanding a level of clutch engagement up to that set by the clutch control member position.

11 Claims, 2 Drawing Sheets $\dfrac{ON}{OFF}=0$  CHECK VALVE CLOSED (NO CURRENT)

$\Delta p$ AT RESTRICTOR 37 = 0

$\dfrac{ON}{OFF}=1$  CHECK VALVE OPEN (CLUTCH RELEASED)

$\Delta p$ AT RESTRICTOR 37 = 16 BAR

CONTROL SYSTEM FOR FLUID PRESSURE OPERATED CLUTCH

BACKGROUND OF THE INVENTION

This invention relates to clutches and in particular to systems for the control of fluid-pressure operated vehicle drive clutches.

With the increasing requirement for clutch control systems which allow automatic control of clutch engagement in response to vehicle operating criteria, there is also a requirement to ensure that the vehicle operator retains a safe level of overall control of the clutch.

It is an object of the present invention to provide a clutch control system which meets the above requirement.

SUMMARY OF THE INVENTION

Thus according to the present invention there is provided a control system for the control of a fluid pressure operated clutch, the control system including:

(a) a fluid pressure operated clutch actuator;
(b) a source of pressurized fluid;
(c) fluid flow control valve means for controlling the flow of pressurized fluid to and exhaust of fluid from the actuator, and
(d) a manually operable clutch control member connected via linkage means with the valve means to allow engagement/disengagement of the clutch by operation of the control member, the control system being characterised in that it also includes:

(i) electrical actuator means for operating the valve means independently of the manually operable clutch control member;
(ii) sensing means for sensing the position of the clutch control member, and
(iii) electrical control means for independent control of the valve means via the electrical actuator, the electrical control means controlling the engagement/disengagement of the clutch in response to one or more predetermined vehicle operating parameters said electrical control means being capable of commanding complete disengagement of the clutch irrespective of the position of the clutch control member but only being capable of commanding a level of clutch engagement up to that set by the clutch control member position.

A clutch control system in accordance with the present invention thus provides an arrangement in which the vehicle operator also has overall control of the level of clutch engagement via the manually operable clutch control member which is normally in the form of a conventional pedal. Thus, for example, the vehicle operator can always override the level of clutch engagement set by the electrical control means, as is necessary in an emergency situation (e.g. when braking hard) or when he requires to inch the vehicle (i.e. move the vehicle a small distance at low speed) during a coupling-up maneuver.

Also, should the electrical operation of the control valve means fail for any reason, the operator is able to continue to control the clutch manually using the pedal.

The control valve means may comprise a single valve which can be actuated independently both manually or electrically or may comprise separate valves connected in parallel, one actuated manually and the other electrically with priority for the manually operated valve.

Where a single control valve is used, the electrical actuator may comprise a solenoid coil which is used to pulse a valve member using pulse width modulation techniques to adjust the level of a pilot pressure which is applied to a pressure-controlling spring-loaded spool member which controls the flow of fluid to and from the clutch actuator so as to maintain a clutch actuator pressure proportional to the on/off ratio of the pulse width modulation, the manually operable clutch member also being connected to the spool member.

The control system may include further sensing means connected to the electrical control means for the measurement of vehicle operating parameters used in the control of the engagement/disengagement of the clutch. The further sensing means may include theoretical and actual speed sensing means, the data from which may be processed to determine a wheel slip operating parameter. They may also include actual engine speed and clutch output speed sensing means enabling a wheel slip operating parameter to be determined. Load sensing means and fuel flow means may also be included. Thus the electrical control means may respond to one, or more than one, of a wide variety of operating parameters.

The clutch control system may be incorporated in a vehicle automatic transmission system in order to automate the clutch operation, thus allowing automatic transmission ratio changes without the need for the vehicle operator to operate the clutch pedal.

The present invention also provides a proportional flow control valve which can be independently actuated either manually or electrically. In a preferred construction the electrical actuator may comprise a solenoid coil which is used to pulse a valve member using pulse width modulation techniques to adjust the level of a pilot pressure which is applied to a pressure-controlling spring-loaded spool member which controls the flow of fluid to and from the clutch actuator so as to maintain a clutch actuator pressure proportional to the on/off ratio of the pulse width modulation, the manually operable clutch member also being connected to the spool member.

The present invention also provides a proportional flow control valve for use in a control system characterised by the inclusion of a valve member which is pulsed by a solenoid coil using pulse width modulation techniques to adjust the level of pilot pressure which is applied by a pressure-controlling spring-loaded spool member so as to maintain a valve output pressure proportional to the on/off ratio of the pulse width modulation the spool member also being manually operable by a linkage connected to the spool member.

BRIEF DESCRIPTION OF THE DRAWINGS

One embodiment of the present invention as applied to an agricultural tractor will be described, by way of example only, with reference to the accompanying drawings in which.

DETAILED DESCRIPTION OF THE PREFERRED EMBODIMENT

Figure 1:
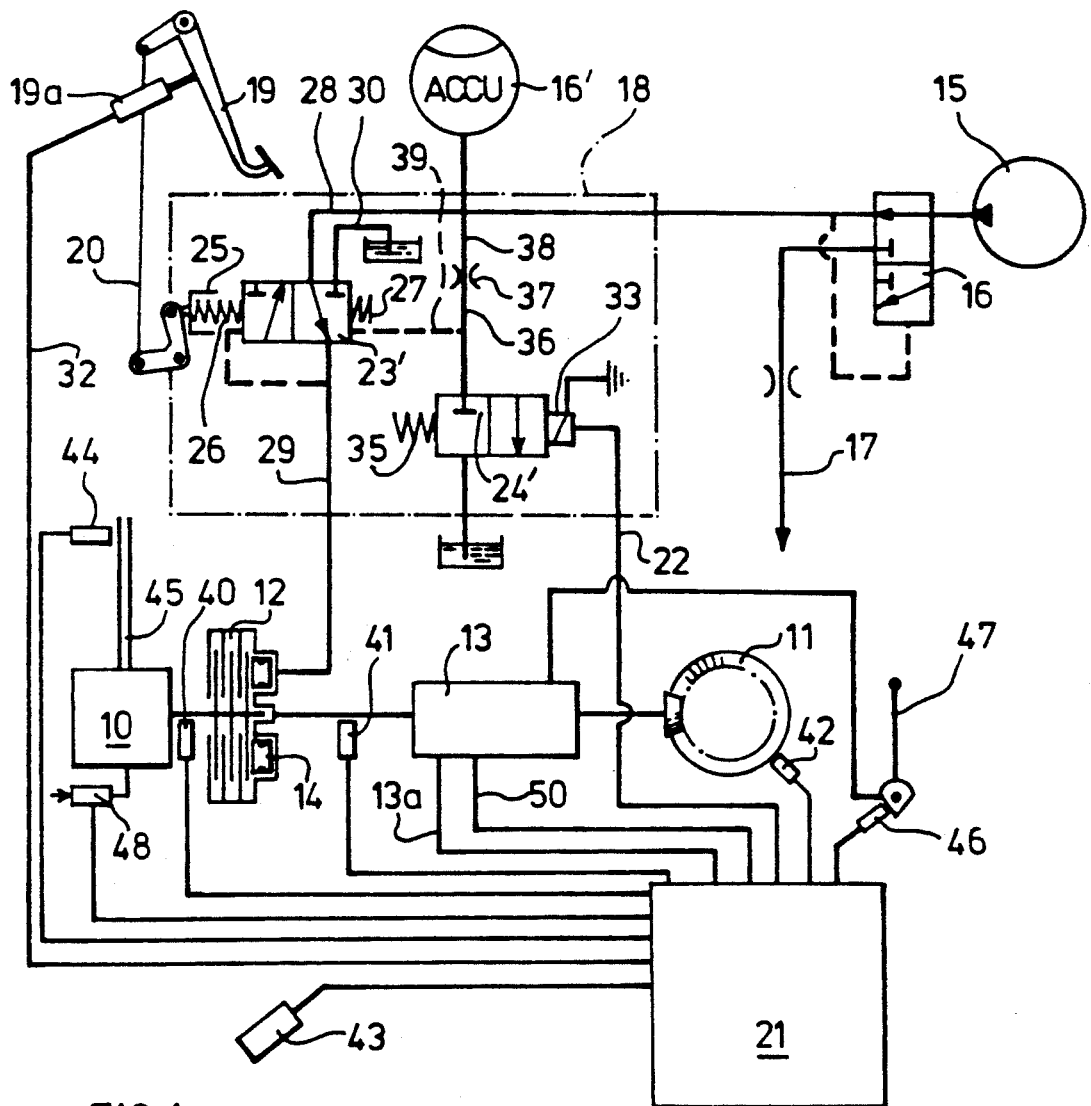
FIG. 1 is a diagrammatic representation of a clutch control system in accordance with the present invention.

FIG. 1 shows a tractor drive line in which an engine 10 drives an axle crown wheel and pinion assembly 11 via a clutch 12 and a gearbox 13. The clutch 12 is of a multi-plate oil-immersed type in which a clutch actuator in the form of an hydraulic piston 14 engages the clutch and a spring means (not shown) disengages the clutch when the piston 14 is not pressurized.

A source of pressurized oil is provided by a pump 15 and is retained at a predetermined pressure (typically 16 bar) by pressure-regulating valve 16 and accumulator 16'. Overspill from the pressure regulating valve is routed via a line 17 to cool the clutch 12.

The supply of pressurized fluid to and the exhaust of fluid from the actuator 14 is under the control of a fluid control valve means 18, which will be described in more detail below and which is also shown diagrammatically in FIG. 2.

The fluid control valve means 18 can be controlled manually by a clutch pedal 19 via a mechanical linkage 20 and can also be controlled electrically by an electrical control means 21 which issues signals to the valve means 18 via electrical line 22. In essence, the control valve means 18 has two main components, a main valve spool 23 (see FIG. 2) which is represented in FIG. 1 as a 2-position valve 23' and a solenoid operated check valve 24' in which again is diagrammatically represented as a 2-position valve 24' in FIG. 1.

Figure 2:
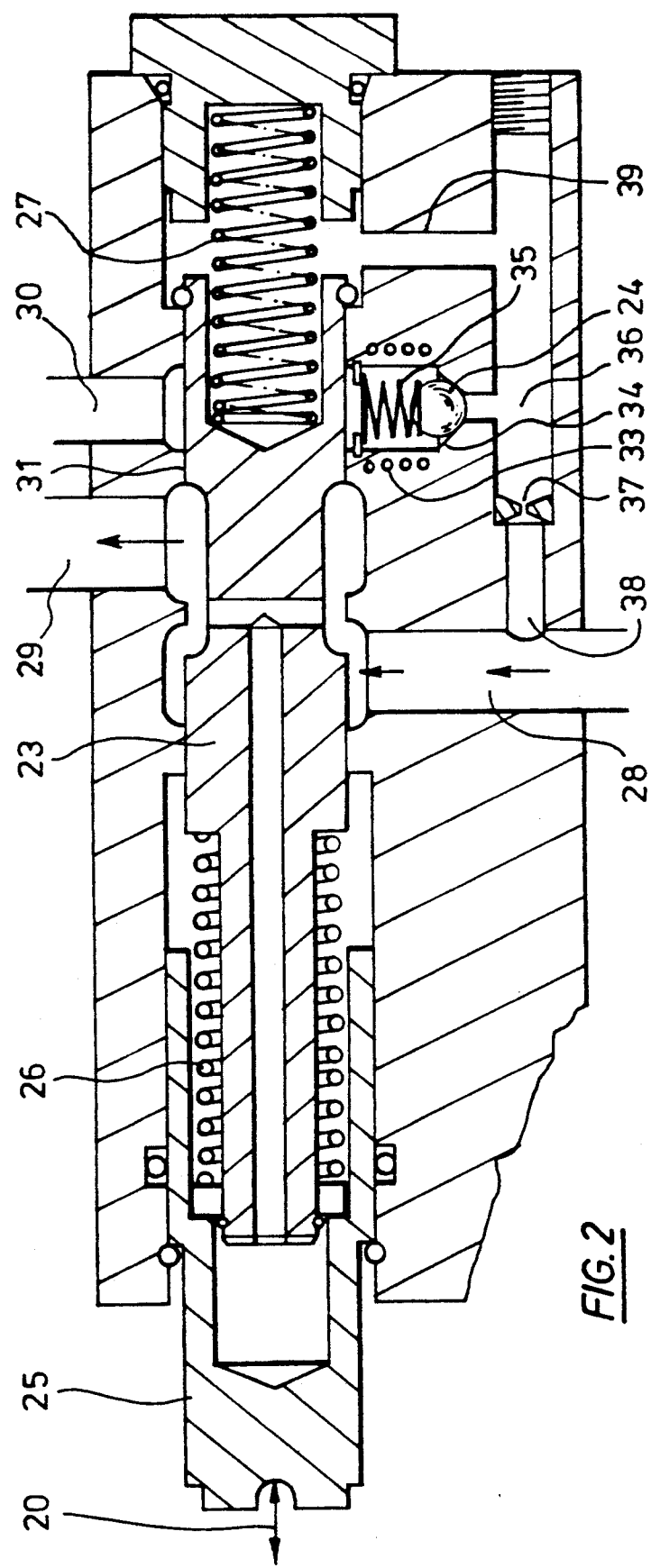
FIG. 2 is a diagrammatic longitudinal section through a manually and electrically controlled fluid flow control valve embodying the invention which is suitable for use in the control system of FIG. 1, and FIG. 3 diagrammatically shows a pulse width modulation signal which is used for the electrical control of the valve of FIG. 2.

As can be seen from FIGS. 1 and 2, the mechanical linkage 20 operates on a cap 25 which in turn acts on the spool 23 via a compression spring 26. A second compression spring 27 also acts on the right-hand of spool 23 to bias the spool to an open position in which the full system pressure of 16 bar is connected from supply line 28 to clutch 12 line 29, thus engaging the clutch as shown in FIGS. 1 and 2.

To disengage manually the operator presses the clutch pedal 19 which moves linkage 20 to displace cap 25 to the right as shown in FIGS. 1 and 2, thus in turn moving the spool 23 to the right via spring 26 while spilling a proportion of the clutch engaging pressure from clutch line 29 to return line 30 via valve seat 31. The construction of the valve is such that the degree of spillage of clutch engaging pressure to the return line 30 via valve seat 31 and hence the clutch engagement pressure, is proportional to the axial displacement of cap 25 by operation of the clutch pedal 19. Thus the clutch engagement pressure is proportional to the clutch pedal position.

A sensor 19a is provided to sense the position of clutch pedal 19 which is fed as an input signal via line 32 to control means 21. The control means 21 controls the operation of valve means 18 by the issuing of electrical signals to the solenoid 33 of check valve 24 via line 22. The signals issued to solenoid 33 are in the form of a pulse width modulated signal having a wave form of the type shown in FIG. 3. These signals pulse the check valve 24 away from its associated seat 34 against the action of a spring 35 and thus control the level of pressure in passage 36 on the downstream side of a restrictor 37, which is in a tapping 38 off the supply line 28. The pressure level in passage 36 is communicated to the right-hand end of spool 23 via drilling 39.

Figure 3:
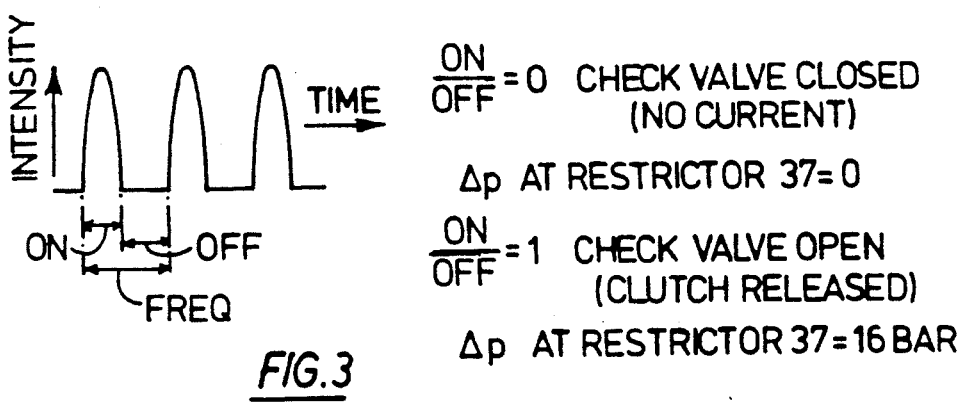

As can be seen from FIG. 3, when no current is supplied to solenoid 33 the on/off ratio of the pulse width modulation signal is zero and the check valve 23 is closed so that the pressure drop across the restrictor 37 is zero and the pressure in passage 36 is the same as in supply line 28. In this condition the application of supply line pressure to the right-hand end of spool 23 ensures that the spool 22 remains in the balanced position shown in FIG. 2 so that the clutch is maintained engaged.

When the on/off ratio of the pulse width modulation signal equals 1, which is the maximum value permitted, the full system pressure of supply line 28 (typically 16 bar) is dropped across the restrictor 37 resulting in the imposition of a very low pressure on the right-hand end of spool 23. This results in the shifting of the spool 23 to the right which connects the clutch line 29 and the return line 30 thus completely disengaging the clutch.

Between the above two extreme positions, the signal sent to the solenoid 33 via line 22, can be set at a level such that the pressure in passage 36, which is connected to the right hand end of spool 23, can be at a wide range of levels corresponding to different levels of clutch engagement.

Thus it is possible to control the valve using the solenoid 33 to pulse the check valve 24 so that the degree of opening of the valve seat 31, and hence the clutch engagement pressure, is proportional to the level of signal sent from the electrical control means 21 via the line 22.

In the example described, the electrical control means 21 also receives a variety of vehicle operating parameters from the following sensors. Sensor 40 provides an indication of the actual engine speed (this may be, for example, a sensor on the engine output shaft or flywheel), sensor 41 provides an indication of clutch output speed, sensor 42 associated with the crown wheel and pinion 11 provides an indication of theoretical speed of the vehicle, sensor 43 which is of the radar type, provides indication of the actual speed of the vehicle, sensor 44 associated with the exhaust stack 45 of the engine provides an indication of exhaust gas temperature which is an indicator of vehicle load and a fuel flow rate sensor 48 is also provided. The electrical control means 21 also receives signals from the gearbox 13 via line 13a indicating which ratio is engaged in the transmission and signals from a sensor 46 associated with a gear ratio selector 47 indicating which gearbox ratio has been selected by the vehicle operator.

The electrical control means 21 processes the above data to determine such other operating parameters as wheel slip by comparison of signals from sensors 42 and 43, and clutch slip by comparison of the output of sensors 40 and 41. The control means 21 processes all the above input data and determines whether the ratio selected by the operator, using selector 47, is the most appropriate ratio, taking into account such factors as vehicle load, fuel consumption, wheel slippage, etc. Should the system decide that a more appropriate ratio should be selected a signal to change the operative ratio of the transmission 13 is issued to ratio selection actuators within the transmission via line 50. These actuators may be, for example, fluid-pressure operated rams controlled by solenoid operated valves. In conjunction with the issuing of a signal to change the operative ratio via line 50, a signal is also issued via line 22 to disengage automatically the main clutch 12 by electrical operation of the control valve means 18 during the automatic ratio change in the transmission.

Since the transmission control aspect of the above described system plays no part in the present invention, no further details of this will be given and, indeed, it will be appreciated that any suitable form of automatic ratio control, which might sense different vehicle parameters from those described above, may be employed.

It is an essential feature of the present invention that the level of clutch engagement commanded by any signal sent to solenoid 33 via line 22 can never exceed the level of clutch engagement commanded by the operator via clutch pedal 19. This is achieved by the construction of valve means 18 in which the rate of spring 26 is chosen such that the level of clutch engagement pressure in line 29 can never be exceeded even if the pressure directed to the right hand end of spool 23 is raised to the level of supply line 28 by pulsation of the check valve 24.

It will be readily appreciated by those skilled in the art that the valve means 18 is appropriate for many applications other than in a clutch control system as described. It may, for instance, be used in automatic control systems for industrial machines such as tractor/-digger/loaders and excavators.

I claim:

1. A control system for the control of a fluid pressure operated clutch, the control system including:
   (a) a fluid pressure operated clutch actuator;
   (b) a source of pressurised fluid;
   (c) fluid flow control valve means for controlling the flow of pressurised fluid to and exhaust of fluid from the actuator, and
   (d) a manually operable clutch control member connected via linkage means with the valve means to allow engagement/disengagement of the clutch by operation of the control member,
   wherein the control system also includes:
   (i) electrical actuator means for operating the valve means independently of the manually operable clutch control member;
   (ii) sensing means for sensing the position of the clutch control member, and
   (iii) electrical control means for independent control of the valve means via the electrical actuator, the electrical control means controlling the engagement/disengagement of the clutch in response to one or more predetermined vehicle operating parameters said electrical control means being capable of commanding complete disengagement of the clutch irrespective of the position of the clutch control member but only being capable of commanding a level of clutch engagement up to that set by the clutch control member position.

2. A control system according to claim 1, wherein the control valve means comprises a single valve which may be actuated independently both manually and electrically.

3. A control system according to claim 1, wherein the control valve means comprises a manually actuated valve and an electrically actuated valve connected in parallel with priority for the manually actuated valve.

4. A control system according to claim 2 wherein the electrical actuator means comprises a solenoid coil which is used to pulse a valve member using pulse width modulation techniques to adjust the level of a pilot pressure which is applied to a pressure-controlling spring-loaded spool member which controls the flow of fluid to and from the clutch actuator so as to maintain a clutch actuator pressure proportional to the on/off ratio of the pulse width modulation, the manually operable clutch member also being connected to the spool member.

5. A control system according to claim 1 wherein it includes further sensing means connected to the electrical control means for the measurement of vehicle operating parameters used in the control of the engagement-/disengagement of the clutch.

6. A control system according to claim 5 wherein the further sensing means include theoretical vehicle speed sensing means and actual vehicle speed sensing means, the data from which the electrical control means processes to determine a wheel slip operating parameter.

7. A control system according to claim 5 wherein the further sensing means include actual engine speed sensing means and clutch output speed sensing means, the data from which the electrical control means processes to determine a clutch slip operating parameter.

8. A control system according to claim 5 wherein the further sensing means include vehicle load sensing means.

9. A control system according to claim 5 wherein the further sensing means include fuel flow sensing means.

10. A vehicle automatic transmission control system including transmission ratio selector actuators for changing the operative ratio of an associated automatic transmission wherein the system includes a clutch control system according to claim 1 in which the electrical control means receives output from one or more vehicle operating parameter sensing means which it uses in conjunction with control criteria to determine whether the currently operative transmission ratio is the most appropriate and, if not, to disengage the clutch, issue signals to the ratio selection actuators to change the operative ratio and re-engage the clutch.

11. A proportional flow control valve for use in a clutch control system according to claim 1 wherein it includes a valve member which is pulsed by a solenoid coil using pulse width modulation techniques to adjust the level of pilot pressure which is applied to a pressure controlling spring-loaded spool member so as to maintain a clutch actuator pressure proportional to the on/-off ratio of the pulse width modulation, the spool member also being manually operable by the manually operable clutch control member.

* * * * *